US 9,589,578 B1

(12) United States Patent
Dippenaar

(10) Patent No.: US 9,589,578 B1
(45) Date of Patent: Mar. 7, 2017

(54) INVOKING APPLICATION PROGRAMMING INTERFACE CALLS USING VOICE COMMANDS

(71) Applicant: Amazon Technologies, Inc., Seattle, WA (US)

(72) Inventor: Andries Petrus Johannes Dippenaar, Cape Town (ZA)

(73) Assignee: Amazon Technologies, Inc., Reno, NV (US)

( * ) Notice: Subject to any disclaimer, the term of this patent is extended or adjusted under 35 U.S.C. 154(b) by 598 days.

(21) Appl. No.: 14/065,776

(22) Filed: Oct. 29, 2013

(51) Int. Cl.
*G10L 25/48* (2013.01)
*G10L 15/26* (2006.01)

(52) U.S. Cl.
CPC ............. *G10L 25/48* (2013.01); *G10L 15/26* (2013.01)

(58) Field of Classification Search
CPC ... G10L 15/30; G10L 15/22; G10L 2015/228; G10L 15/26; G10L 25/48; G06F 21/32; H04L 67/125
See application file for complete search history.

(56) References Cited

U.S. PATENT DOCUMENTS

| 2015/0058447 A1* | 2/2015 | Albisu | H04L 67/02 709/219 |
| 2015/0120287 A1* | 4/2015 | Stern | G10L 15/183 704/231 |

OTHER PUBLICATIONS

Plannerer, B. "An Introduction to Speech Recognition" Mar. 28, 2005, © 2003 Bernd Plannerer, Munich, Germany [online][retrieved on: Oct. 29, 2013] retrieved from: http://www.speech-recognition.de/pdf/introSR.pdf, 68 pps.

(Continued)

*Primary Examiner* — Angela A Armstrong
(74) *Attorney, Agent, or Firm* — Lee & Hayes, PLLC

(57) ABSTRACT

Technologies are described herein for invoking API calls through voice commands. An annotated API description is received at a voice API interface. The annotated API description comprises descriptions of one or more APIs and speech annotations for the one or more APIs. The voice API interface further receives a voice API command from a client. By utilizing the annotated API description and the speech annotations contained therein, the voice API interface converts the voice API command into an API call request, which is then sent to the corresponding service for execution. Once the service returns an API call result, the voice API interface interprets the API call result and further converts it into an audio API response based on the information contained in the annotated API description and the speech annotations. The audio API response is then sent to the client.

20 Claims, 5 Drawing Sheets

(56) References Cited

OTHER PUBLICATIONS

Web Article: "VoiceXML" published by Wikipedia [online][retrieved on: Oct. 29, 2013] retrieved from: http://en.wikipedia.org/wiki/VoiceXML , 5 pps.

Web Article: "Pronunciation Lexicon Specification" published by Wikipedia [online][retrieved on: Oct. 29, 2013] retrieved from: http://en.wikipedia.org/wiki/Procunciation_Lexicon_Specification, 8 pps.

Web Article: "Speech Recognition Grammar Specification" published by Wikipedia [online][retrieved on: Oct. 29, 2013] retrieved from: http://en.wikipedia.org/wiki/Speech_Recognition_Grammar_Specification, 3 pps.

Web Article: "Semantic Interpretation for Speech Recognition" published by Wikipedia [online][retrieved on: Oct. 29, 2013] retrieved from: http://en.wikipedia.org/wiki/Semantic_Interpretation_for_Speech_Recognition, 3 pps.

* cited by examiner

INVOKING APPLICATION PROGRAMMING INTERFACE CALLS USING VOICE COMMANDS

BACKGROUND

An application programming interface ("API") is a set of programming instructions and standards for accessing functionality provided by a program. For example, an API may specify how other software components should interact with the program being accessed. Developers of various software components can generate requests to an API by including API calls in the code of their software components. The syntax of the API calls may be described in the documentation of the API that is being called. Traditionally, APIs only support machine-to-machine communications and are software-to-software interfaces. Using APIs, applications may communicate with one another without any user knowledge or intervention.

Certain types of services, like Web services, typically expose their functionality almost exclusively through APIs. Consequently, an end user may have to utilize a software module to invoke API calls to utilize functionality provided by a service. Sometimes, however, end users may find it difficult to access or build such a software module. For example, some users may not have access to a computing device at the time they wish to make an API call. Others might only have access to a computing device that is not equipped with traditional input/output mechanisms like a monitor, a keyboard, a mouse, a touchscreen, etc., such as the GOOGLE GLASS wearable computer developed by GOOGLE INC. of Mountain View, Calif. In these situations, traditional mechanisms for invoking API calls typically would not enable an end user to access functionality provided through an API.

The disclosure made herein is presented with respect to these and other considerations.

DETAILED DESCRIPTION

Figure 1:
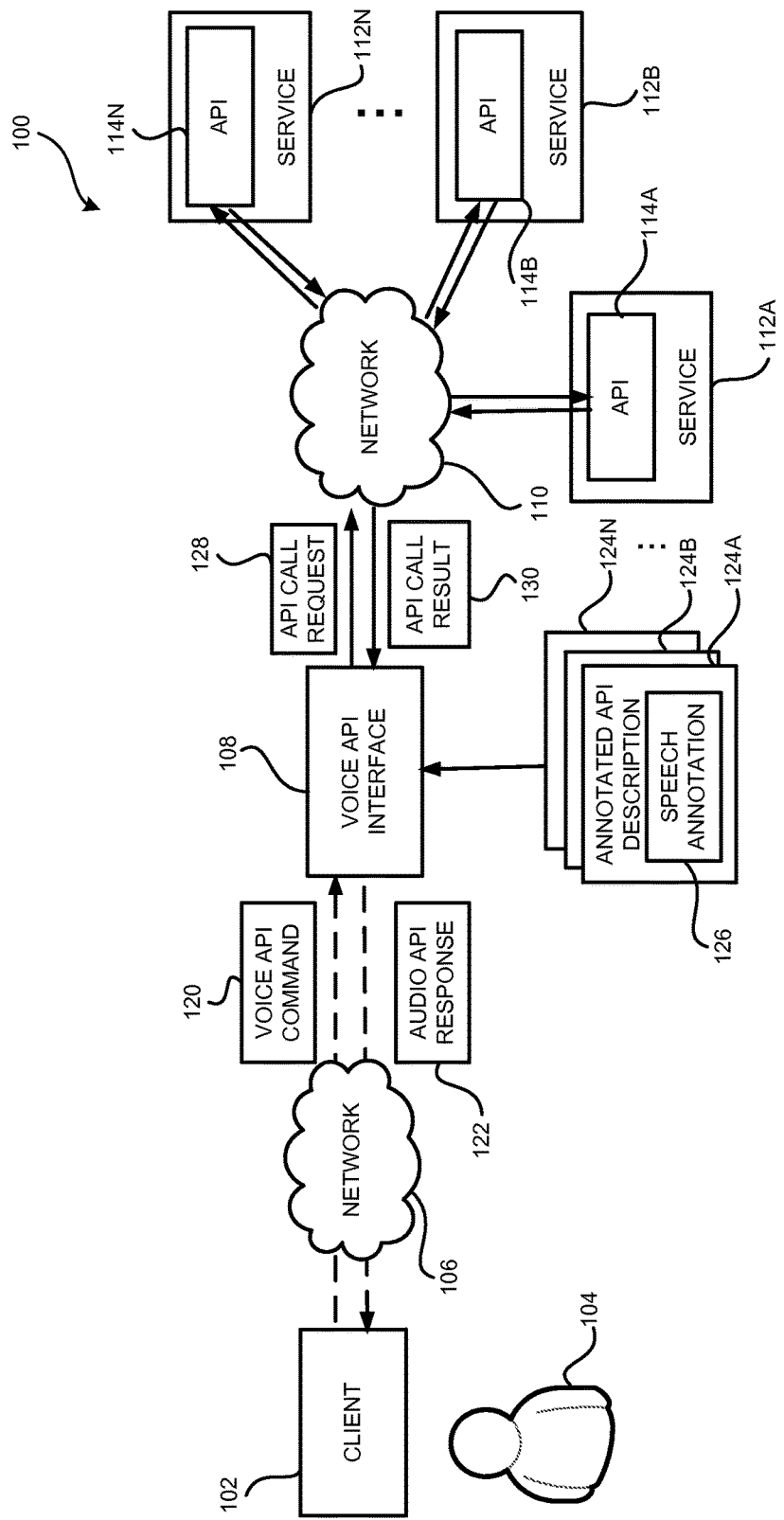
FIG. 1 is a system diagram showing aspects of one mechanism disclosed herein for invoking API calls through voice commands.

The following detailed description is directed to technologies for invoking API calls through voice commands. Utilizing the technologies described herein, an end user can make an API call using a voice command. The results of the API call can then be returned as an audio response or a spoken output. Thus, the functionality provided by various APIs can be accessed and utilized without the end user creating a program for calling the APIs and without any computing device.

According to one aspect presented herein, a computer-implemented mechanism is disclosed for invoking API calls through voice commands. In order to provide this functionality, API descriptions describing one or more APIs may be annotated with speech annotations to facilitate API calls through voice commands. The annotated API descriptions may be sent to a voice API interface that may also receive a voice API command from a user for invoking one or more API calls. The voice API interface may then convert the voice API command into a text API command utilizing the speech annotations contained in the annotated API descriptions. The text API command may further be translated into an API call request based on the annotated API description. An API call may then be invoked by sending the API call request to the corresponding service application.

Once the service application returns an API call result, a text result interpretation may be generated based on the API call results and the annotated API description. The text result interpretation may then be converted into an audio API response by utilizing the information contained in the speech annotations of the annotated API description. The audio API response may then be sent to the user. Additional details regarding the various components and processes described above for invoking API calls through voice commands will be presented below with regard to FIGS. 1-5.

It should be appreciated that the subject matter presented herein may be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will also appreciate that aspects of the subject matter described herein may be practiced on or in conjunction with other computer system configurations beyond those described herein, including multiprocessor systems, microprocessor-based or programmable customer electronics, minicomputers, mainframe computers, handheld computers, personal digital assistants, e-readers, cellular telephone devices, special-purposed hardware devices, network appliances, and the like. As mentioned briefly above, the embodiments described herein may be practiced in distributed computing environments, where tasks may be performed by remote computing devices that are linked through a communications network. In a distributed computing environment, program modules may be located in both local and remote memory storage devices.

In the following detailed description, references are made to the accompanying drawings that form a part hereof, and that show, by way of illustration, specific embodiments or examples. The drawings herein are not drawn to scale. Like numerals represent like elements throughout the several figures (which may be referred to herein as a "FIG." or "FIGS.").

FIG. 1 is a system diagram showing a system 100 that includes services 112A-112N (which may be referred to individually as a service 112 or collectively as services 112) accessible to a user 104. As used herein, "services" or "service applications" refer to discrete software modules or programs that can provide certain functionality. Each service 112 implements at least one operation that may involve one or more computing resources, such as memory or storage devices. Each service 112 may execute on one or more host devices (not shown). The host devices may be web servers, application servers, network appliances, dedicated computer hardware devices, personal computers ("PC"), or any combination of these and/or other computing devices known in the art. The services 112 may be accessible through a network 110, which may be a local-area network ("LAN"), a wide-area network ("WAN"), the Internet, or any other networking topology known in the art that enables API calls to be sent to the services 112.

Each of the services 112A-112N may expose an API 114A-114N, respectively, which may be referred to herein individually as an API 114 or collectively as APIs 114. As discussed above, an API 114 exposed by a service 112 defines the interface for accessing functionality provided by the service 112. An API 114 may be a library, for example, that includes specifications for routines, data structures, object classes, and variables. When used in the context of web development, an API 114 may be a web service API containing a set of programming instructions and standards for accessing the web service.

Each of the APIs 114A-114N may be published along with an annotated API description 124A-124N, which may be referred to herein individually as an annotated API description 124 or collectively as annotated API descriptions 124. In some implementations, each API 114 may publish its own annotated API description 124, while in other implementations one annotated API description 124 may contain information for multiple APIs. The annotated API description 124 provide a machine-readable description of how the service 112 defined by the API 114 may be called, including, but not limited to, information such as the format or syntax of the API calls, operations/methods and resources involved in the API calls, input parameters and/or outputs of the API calls, properties of the input parameters and output results, and others. Terms or words in the annotated API description 124 that pertain to information such as operations/methods, resources, input parameters, output results and other information of the API 114, are collectively referred to herein as "keywords" of the API 114.

The system 100 may also include a voice API interface 108 that provides functionality for invoking API calls through voice commands. The voice API interface 108 may receive a voice API command 120 from a user 104 and convert the voice API command 120 into an API call request 128 for a corresponding service 112. The returned API call result 130 from the corresponding API 114 or the service 112 may then be converted by the voice API interface 108 into an audio API response 122 to be presented to the user 104. In some embodiments, the voice API interface 108 may be provided together with each service 112, which may allow a software development kit ("SDK") including the service 112 and the functionality provided by the voice API interface 108 to be provided to a customer of the service 112. In another embodiment, the voice API interface 108 may be offered as a separate service with one voice API interface 108 managing calls to one or multiple APIs 114.

According to embodiments, the communication between the user 104 and the voice API interface 108 may be realized through a client 102. A user 104 may provide a voice API command 120 to the client 102 which, in turn, may submit the voice API command 120 to the voice API interface 108. Likewise, the returned audio API response 122 from the voice API interface 108 may be sent to the client 102, which may then present the audio API response 122 to the user 104.

The client 102 may be a user device or a module executing on a user device. The user device may be a PC, a laptop, a notebook, a personal digital assistant ("PDA"), a game console, a set-top box, an e-reader, a consumer electronics device, a smartphone, a tablet computing device, a server computer, a traditional telephone device, an Internet telephony device or any other device capable of taking a voice API command 120 as a voice input from the user 104, sending the voice API command 120 to the voice API interface 108, receiving audio API response 122, and presenting it to the user 104. The client 102 may be connected to the voice API interface 108 through a network 106, which may be a LAN, a WAN, the Internet, or any other networking topology known in the art that connects the client 102 to the voice API interface 108.

While FIG. 1 illustrates the use of a network 106 and a network 110 in order to enable the communications between the client 102, the voice API interface 108, and the services 112, it should be understood that any number of entities illustrated in FIG. 1 may be able to directly communicate with each other without the use of a network. For example, the voice API interface 108 and the services 112 may be located on the same service host. In another example, both the voice API interface 108 and the services 112 may reside on the same device as the client 102.

The voice API command 120 may be submitted by the user 104 through the client 102 as a complete command. Alternatively, or additionally, the user 104 may interact with the voice API interface 108 to obtain guidance from the voice API interface 108 for inputting the voice API command 120. For example, for the operations or parameters involved in the API call, the voice API interface 108 may provide a list of candidates for the user 104 to choose from, or the voice API interface 108 may ask the user to input, one by one, the parameters or resources required for the API call.

In some embodiments, the user 104 may also record the voice API command 120 as an audio file and store the audio file in a storage medium accessible to the client 102. The client 102 may retrieve the audio file containing the voice API command 120 at a predetermined time and send it to the voice API interface 108. For example, user 104 may want to know the usage of a particular resource on a given day. Rather than wait until midnight of that day, the user 104 may record the voice API command 120 as an audio file and instruct the client 102 to submit the voice API command 120 to the voice API interface 108 around midnight.

In other scenarios, the user 104 may need to invoke the same API call multiple times to check the status of a resource at different time points. The user 104 could record the voice API command 120 once and configure the client 102 to submit the recorded voice API command 120 at specified points in time. Furthermore, if the service 112 is unavailable at the time when the user 104 attempts to invoke the API calls, the user 104 may also record the voice API command 120 and instruct the client 102 to submit the voice API command 120 when the corresponding service 112 becomes available. In another embodiment, a library of the recorded voice API commands 120 from the user 104 may be maintained. The user 104 may send the recorded voice API commands 120 in the library individually for simple tasks as described above. Alternatively, or additionally, the user 104 may send the recorded voice API commands 120 in the library as a group and/or in a certain order to achieve more complicated tasks.

Similarly, upon receiving the audio API response 122, the client 102 may present the audio API response 122 to the user 104 immediately. Alternatively, or additionally, the audio API response 122 may be stored as an audio file such as in a voice mail system accessible to the client 102 or any other device used by the user 104. The user 104 may retrieve the audio file at any time to listen to the audio API response 122, or to delete or archive the audio API response 122.

As discussed above, once the voice API interface 108 receives the voice API command 120 from a user 104, it may convert the voice API command 120 into an API call request 128 for the corresponding API 114 of service 112. To facilitate the conversion, each annotated API description 124 may contain speech annotation 126 that may be utilized by the voice API interface 108 to perform the conversion.

The speech annotation 126 may include hints on how to recognize words/terms referencing various resources, methods, or parameters of a service 112 in the voice API command 120. According to embodiments, the speech annotation 126 might also include acoustic models for the keywords and/or phonemes contained in the keywords of the API 114. The acoustic models may be represented as stochastic models modeling the speech signals of the keywords and/or the phonemes of the keywords along with parameters for each of the stochastic models, or as audio feature vectors calculated in the time domain and/or the frequency domain of the speech signals. Other representations of the acoustic models that capture the acoustic features of the speech signal may also be employed and included in the speech annotation 126.

Returned API call results 130 from the corresponding API 114 may also be received and processed by the voice API interface 108. The API call result 130 may be in an abstract format that is human-unreadable. According to embodiments, the voice API interface 108 may interpret those abstract representations of the API call result 130 into a human understandable language and further convert it into an audio API response 122 to present the API call result 130 to the user 104. Information that can facilitate the interpretation of the API call result 130 may also be included in the annotated API description 124 and utilized by the voice API interface 108. Additional details regarding the voice API interface 108 and the annotated API description 124 will be presented below with regard to FIGS. 2-4.

Figure 2:
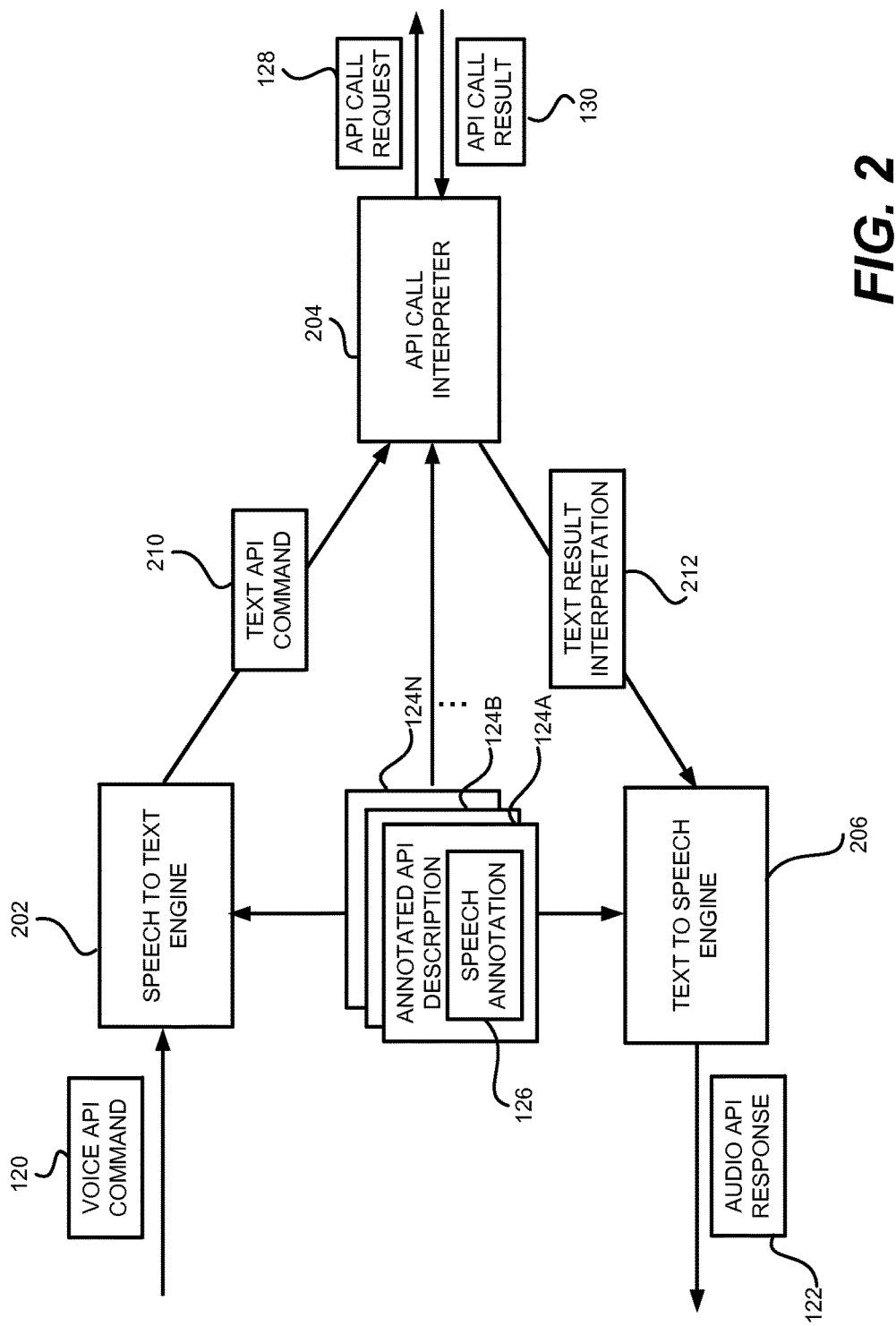
FIG. 2 is a software architecture diagram illustrating aspects of a voice API interface configured to support API calls through voice commands, according to embodiments presented herein.

FIG. 2 is a software architecture diagram illustrating aspects of the voice API interface 108 according to embodiments presented herein. As shown in FIG. 2, the voice API interface 108 may include a speech to text engine 202, an API call interpreter 204 and a text to speech engine 206. According to embodiments, the speech to text engine 202 may convert the voice API command 120 into a text API command 210 containing texts corresponding to spoken words in the voice API command 120.

As known in the art, spoken words may be characterized using acoustic models represented by sequences of feature vectors. A spoken word in an utterance or an input speech signal may be identified by comparing the sequence of feature vectors of the spoken word with one or more sequences of prototype feature vectors, which represent the words to be recognized, called "vocabulary." The speech to text engine 202 may select from the vocabulary a word whose sequence of prototype feature vectors has the smallest distance to the sequence of feature vectors of the spoken word as the recognized word. Alternatively, rather than relying on the prototype feature vectors of words in the vocabulary, the speech to text engine 202 may employ stochastic models for the generation of feature vectors corresponding to words in the vocabulary to recognize words. For instance, an utterance may be recognized as or assigned to a word if the utterance best fits the stochastic model of that word. In one embodiment, the stochastic models for modeling the spoken words/speech are Hidden Markov Models ("HMMs").

While prototype feature vectors and stochastic models are described herein as acoustic models for speech-to-text conversion or speech recognition, it should be appreciated that other models or other methods of recognizing speech signals may also be employed, such as speech recognition based on neural networks. It is intended that this application encompass the use of any techniques for speech to text conversion.

According to one embodiment, the speech to text engine 202 may further employ the speech annotation 126 and/or other information contained in the annotated API description 124, during the speech recognition of the voice API command 120. As briefly mentioned above, the speech annotation 126 contained in the annotated API description 124 may include hints on how to recognize command referencing various resources, methods, or parameters of an API 114. In embodiments, the speech annotation 126 may contain annotations for keywords of the API 114 along with their corresponding phonemes, and include acoustic models for the keywords and/or the phonemes of the keywords of the API 114. For example, an API 114 may be exposed by a service 112 that can attach a storage volume to a virtual machine instance running on a certain device. The annotated API description 124 of the API 114 may describe the functionality of the service 112 and may further define the format or syntax of a call to the service 112 as "attach volume_ID instance_ID device_ID", where "attach" is the name of the operation/method, "volume_ID," "instance_ID," and "device_ID" are three input parameters required for the operation "attach" representing a storage volume, an instance and a device, respectively.

The call request described above will instruct the service 112 to attach a storage volume identified by "volume_ID" to a virtual machine instance identified by "instance_ID" running on a host device with identification "device_ID." The annotated API description 124 may further define the properties of each of the parameters. For instance, the annotated API description 124 may describe that the parameter "volume_ID" ID" is a four-digit number within a range of 0000-4999; the parameter "instance_ID" is also a four-digit number, but within a range of 5000-9000; and the parameter "device_ID" is a string consisting of three characters.

In this example, the keywords of the API 114 may include "attach," "volume," "instance," "device," digits "0" through "9", and characters "a" through "z." The speech annotation 126 of the annotated API description 124 may thus include phonemes for these keywords and acoustic models for one or more of the keywords and/or the phonemes contained in the keywords. As discussed above, the acoustic models may be represented as sequences of feature vectors, stochastic models along with their parameters, or any other format that is suitable for representing acoustic models for speech signals.

The speech annotation 126 may further include a command model that captures the properties of command language, and allows prediction of subsequent words for a given word in the voice API command 120. Such a command model may be built, for example, using formats of API calls described in the annotated API description 124. When a name of an operation, such as "attach," is recognized, the command model may be utilized to predict that subsequent words would be the parameters of the operation, such as "volume_ID," "instance_ID," and "device_ID" as illustrated in the above example. It should be appreciated that the examples given above are merely illustrative and that other formats of API calls, and/or other ways of identifying keywords, representing acoustic models and command models may be employed in a similar manner.

According to various embodiments, the speech annotation 126 may include additional information that may be useful for the speech recognition performed by the speech to text engine 202. For example, the speech annotation 126 may include acoustic models for alternative expressions of keywords of an API 114. In the example discussed above, some users may refer to a storage volume 1234 as "volume 1234" or "storage volume 1234;" while other users might refer to the storage volume as "vol 1234." To accommodate different expressions of a keyword, the speech annotation 126 may also include acoustic models for each of these alternative expressions. Furthermore, the speech annotation 126 may also take into account languages spoken or preferred by the user 104, and include acoustic models that are adapted to the preferred language of the user 104, such as the native language of the user 104. In some implementations, the speech annotation 126 may include pronunciation information following the pronunciation lexicon specification ("PLS"). It will be appreciated that additional information may be included in the speech annotation 126 beyond those described herein, and that not all the information described will be present in the speech annotation 126 of every annotated API description 124 for every API 114.

Once the speech to text engine 202 has converted the voice API command 120 into a text API command 210, the API call interpreter 204 may further translate the text API command 210 into an API call request 128 according to the format defined in the annotated API description 124. The API call request 128 may then be sent to the corresponding service 112 for execution.

Some of the services 112 may have security requirements. For example, a policy controlling the execution of a service 112 may require authentication of the user 104 before executing the requested service 112. In such a situation, a biometric feature may be generated from the voice API command 120 and be utilized to authenticate the user 104. A biometric profile may have been built for each registered user, and the user 104 may be authenticated if the biometric feature generated from the voice API command 120 matches the biometric profile of the user 104. In one implementation, the biometric feature may be utilized along with a private key of the user 104 to sign the API call request 128. In another implementation, the biometric feature may be appended to the API call request 128 and a signature may be generated for both the API call request 128 and the biometric feature using the private key of the user 104. Additionally, or alternatively, a portion of the voice API command 120 may be sent along with or in place of the biometric feature as a voice sample of the user 104. The voice sample may be utilized for the authentication of the user 104 through, for example, voice recognition. Similarly, the user 104 may also provide a password for accessing the API 114 in the voice API command 120 if a password is required for authentication. The speech signal corresponding to the password may also be converted into text and sent together with the API call request 128.

The returned API call result 130 from the corresponding API 114 of the service 112 may be received at the API call interpreter 204, and translated into a text result interpretation 212. Depending on the nature of the services 112, the returned API call result 130 may be represented using an abstract format that is human-unreadable, such as abstract numbers, strings or characters. For example, a service 112 may return an API call result 130 as a number of value "0" or value "1," with "0" representing a failure of the call, and "1" representing a success. Such an abstract representation may not be meaningful to the user 104 if the user 104 is not provided with further explanation of the results. Sometimes such abstract representation of the API call result 130 may also be confusing because different services 112 may return the same result but with different meanings. For instance, one service 112 may use a number with value "0" to represent a failure of the service call, while another service 112 may use the same value "0" to represent a success of the service call.

According to embodiments, the API call interpreter 204 may be employed to interpret the API call result 130 into a text result interpretation 212 using a human-understandable language or in a human-readable format. Such a text result interpretation 212, when converted into the audio API response 122 and presented to the user 104, may be readily understood by the user 104 without referring to further details of the API 114. In one implementation, the interpretations of the API call result 130 or a mapping of the API call result 130 to a text result may be included in the annotated API description 124. In the example discussed above, an API call result 130 for an API call "attach volume_ID instance_ID device_ID" may be returned containing a value "0" if the operation fails or a value "1" if the operation succeeds. The annotated API description 124 may contain an interpretation for a returned value "1" as "volume_ID has been successfully attached to instance_ID associated with device_ID," and an interpretation for a returned value "0" as "attaching volume_ID to instance_ID associated with device_ID has failed."

Based on the annotated API description 124 and the actual API call request 128, the API call interpreter 204 may generate the text result interpretation 212 corresponding to the API call result 130. For example, for a API call of "attach 1234 5678 sdh," the generated text result interpretation 212 may be "volume 1234 has been successfully attached to instance 5678 associated with device sdh," if value "1" is returned, or "attaching volume 1234 to instance 5678 associated with device sdh has failed," if value "0" is returned.

According to another embodiment, rather than obtaining interpretation from the annotated API description 124, the API call interpreter 204 may utilize natural language generation ("NLG") technology to convert the abstract representation of the API call result 130 into a natural language representation that can be understood by the user 104. Furthermore, the user 104 may also specify a preference on how much detail he/she wants to hear in the results, such as through user account setup/configuration or through the voice API command 120. The API call interpreter 204 may address such a requirement by processing the text result interpretation 212 and/or the API call result 130 based on the preference of the user 104, such as by filtering, transforming or simplifying the API call result 130 or adding or removing interpretations. It should be appreciated that the examples presented above for generating interpretations of the API call result 130 are for illustration only and should not be construed as limiting.

The generated text result interpretation 212 may then be converted by the text to speech engine 206 using speech synthesis technology into the corresponding audio format and output as an audio API response 122 to the client 102. As known in the art, speech synthesis may be realized by assigning phonetic transcriptions to each word, and dividing and marking the input text into prosodic units. Phonetic transcriptions and prosody information, collectively called symbolic linguistic representation, may then be converted into sound by a synthesizer.

In some implementations, speech synthesis may be achieved by concatenating pieces of recorded speech that are stored in a database. Apart from these speech synthesis technologies, the text to speech engine 206 may also benefit from speech synthesis information contained in the speech annotation 126. By way of example, and not limitation, the speech synthesis information may include phonetic transcriptions for words that may be contained in the text result interpretation 212, prosody information for the text result interpretation 212, and/or access information for recorded speech of elements in the text result interpretation 212, if there is any.

In one embodiment, the speech annotation 126 may contain prosody information for the text result interpretation 212 along with phonetic transcriptions for a subset of the words included in the text result interpretation 212. The subset of words may include words contained in the text result interpretation 212 that may not be understood by the text to speech engine 206. For example, the text result interpretation 212 may contain terms, such as abbreviations, that are specific to the service 112 and may have unique pronunciations. In such a scenario, the speech annotation 126 may be annotated with phonetic transcriptions for these specific terms. Some of these terms may have corresponding recorded speech stored in a database that is accessible to the text to speech engine 206. The access information including the location of the recorded speech may also be contained in the speech annotation 126. The text to speech engine 206 may then choose to synthesize the speech using the phonetic transcriptions or to use the recorded speech depending on the situations of the text to speech engine 206, such as workload, network bandwidth, storage availability, etc. The generated audio API response 122 may then be sent to the client 102 for presentation to the user 104.

Figure 3:
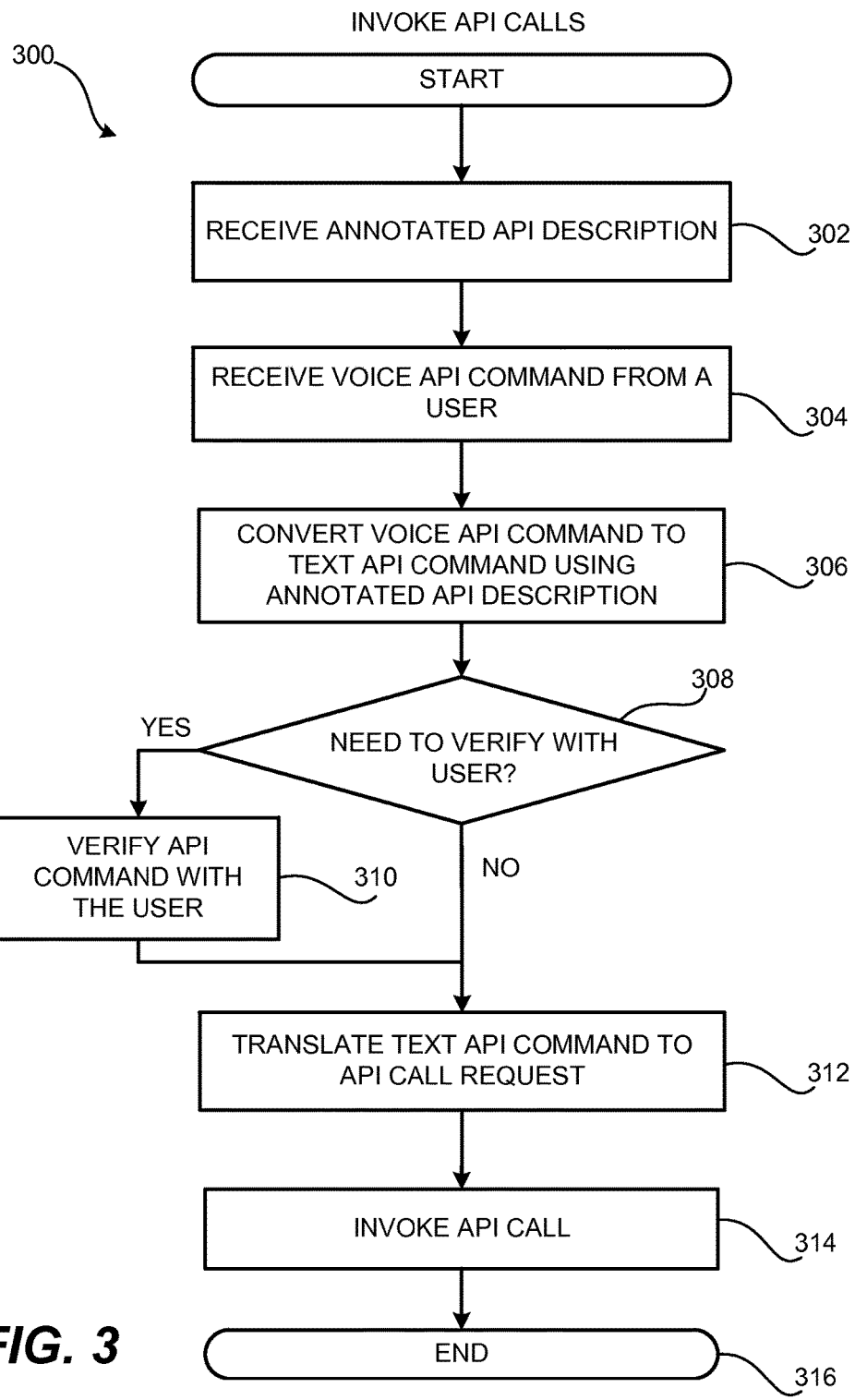
FIG. 3 is a flow diagram showing one illustrative routine for submitting API calls through voice commands from a client, according to one embodiment disclosed herein.

FIG. 3 is a flow diagram showing one illustrative routine 300 for submitting API calls through voice commands received from a user 104, according to one embodiment disclosed herein. In some implementations, the voice API interface 108 described above in regard to FIG. 1 may perform operations of the routine 300. It should be appreciated, however, that the routine 300 might also be performed by other modules and/or components or other entities in the system 100.

It should also be appreciated that the logical operations described herein with respect to FIG. 3, and the other FIGS., may be implemented (1) as a sequence of computer implemented acts or program modules running on a computing system and/or (2) as interconnected machine logic circuits or circuit modules within the computing system. The implementation of the various components described herein is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic, and any combination thereof. It should also be appreciated that more or fewer operations may be performed than shown in the FIGS. and described herein. These operations may also be performed in parallel, or in a different order than those described herein.

The routine 300 begins at operation 302, where one or more annotated API descriptions 124 are received from one or more APIs 114 of the services 112. As discussed above, an annotated API description 124 may contain information for one API 114 or for multiple APIs 114. The annotated API description 124 may provide a machine-readable description indicating how the service 112 defined by the API 114 may be called, including, but not limited to, information such as the format or syntax of the API calls, operations/methods and resources involved in the API calls, input parameters and/or outputs of the API calls, properties of the input parameters and output results, and others. The annotated API description 124 may further include interpretations of API call result 130.

The annotated API description 124 may also contain speech annotation 126 that may be utilized in processing API calls through voice commands. The speech annotation 126 may contain, but is not limited to, hints on how to recognize words/terms referencing various resources, methods, or parameters of a service 112 in the voice API command 120. In embodiments, the speech annotation 126 may include acoustic models for the keywords and/or the phonemes contained in the keywords of the API 114. The acoustic models may be represented as, for example, stochastic models modeling the speech signals for the keywords and/or the phonemes of the keywords along with parameters for each of the stochastic models, or as audio feature vectors calculated in the time domain and/or the frequency domain of the speech signals. The speech annotation 126 may further include a command model that captures the properties of command language, and allows prediction of subsequent words for a given word in the voice API command 120. In one implementation, the command model may be specified according to speech recognition grammar specification ("SRGS") and semantic interpretation for speech recognition ("SISR").

The speech annotation 126 may also include acoustic models for alternative expressions of keywords of an API, and acoustic models that are adapted to the native or preferred language of the user 104. Information to facilitate the speech synthesis may be further included in the speech annotation 126. The speech synthesis information may include phonetic transcriptions for words that may be contained in the text result interpretation 212, prosody information for the text result interpretation 212, and/or access information for recorded speech of elements in the text result interpretation 212, if there is any. In some implementations, the speech annotation 126 or a portion of it may be in the format of a voice extensible markup language ("VoiceXML") and/or be generated by an interactive voice response ("IVR") server.

From operation 302, the routine 300 then proceeds to operation 304, where a voice API command 120 may be received from a client 102. As discussed above, the voice API command 120 may be sent by the user 104 through the client 102 instantly or may be retrieved from a storage medium accessible to the client 102, which stores pre-recorded voice API commands 120 by the user 104. The pre-recorded voice API commands 120 may be retrieved and sent to the voice API interface 108 at a predetermined time specified by the user 104 or periodically according to rules set up by the user 104.

The routine 300 then proceeds from operation 304 to operation 306, where the received voice API command 120 may be converted into a text API command 210 through speech recognition. The speech annotation 126 contained in the annotated API description 124 may be utilized in the conversion. For instance, the acoustic models for the keywords and/or the phonemes contained in the keywords and the command model of the API 114 may be utilized to establish accurate acoustic models and/or to reduce the search space of recognized words for the conversion of the corresponding text API command 210.

From operation 306, the routine 300 then proceeds to operation 308, where a determination may be made as to whether the converted text API command 210 needs to be verified with the user 104. Such a determination may be made based on the speech recognition results. For example, some words may be recognized with low confidence, and verification with the user 104 may help to confirm the recognized words and/or correct any error in the converted text API command 210. In these situations, the operation 308 may decide that verification is needed for the converted text API command 210 if the confidence score of the recognition is below a certain threshold. There may also be situations wherein some parameters or keywords that should be included in an API call are missing from the recognized text API command 210, and thus verification or extra information may be needed from the user 104. In other scenarios, the user 104 may prefer to verify every text API command 210 that has been converted to ensure the accuracy of the submission of the API command, in which case the operation 308 may always decide that verification is needed.

Upon determining that the converted text API command 210 needs to be verified, the routine 300 proceeds to operation 310, where the text API command 210 is verified with the user 104. In one implementation, the text API command 210 may be converted into a speech signal and presented to the user 104. The user 104 may then provide his/her feedback through voice input. Depending on the nature of the verification, the feedback may be a correction of terms in the voice API command 120, a resubmission of the voice API command 120 or simply a spoken word, such as a "yes," to confirm the correctness of the text API command 210. In some embodiments, the feedback provided by the user 104 may also be employed to improve the speech to text engine 202. For example, a positive confirmation from the user 104 may be utilized to modify the calculation of the confidence score to increase the confidence score of the same words in future speech recognitions. A correction of words by the user 104 may be incorporated into the current acoustic model for those words so that the future recognition would output the correct words. It should be appreciated that these examples are only illustrative and should not be construed as limiting. Other ways of incorporating the feedback provided by the user 104 to improve the speech to text engine 202 may be utilized by following the same principles described above.

From operation 310, or if it is determined at operation 308 that no verification is needed from the user 104, the routine 300 proceeds to operation 312, where the text API command 210 may be translated into an API call request 128. The translation may be performed by extracting keywords from the text API command 210 and generating an API call request 128 in a format defined in the annotated API description 124 based on those keywords. The routine 300 may then proceed to operation 314 where the generated API call request 128 may be sent to the corresponding API 114 of the service 112 for execution. From operation 314, the routine 300 proceeds to operation 316, where it ends.

While FIG. 3 illustrates that the verification of the voice API command 120 from the user 104 occurs after the generation of the text API command 210, it should be understood that the verification can be performed at any operation of the routine 300. For example, the verification can be conducted during the conversion of the voice API command 120 to the text API command 210 at operation 306, or during or after the generation of the API call request 128 at operation 312.

Figure 4:
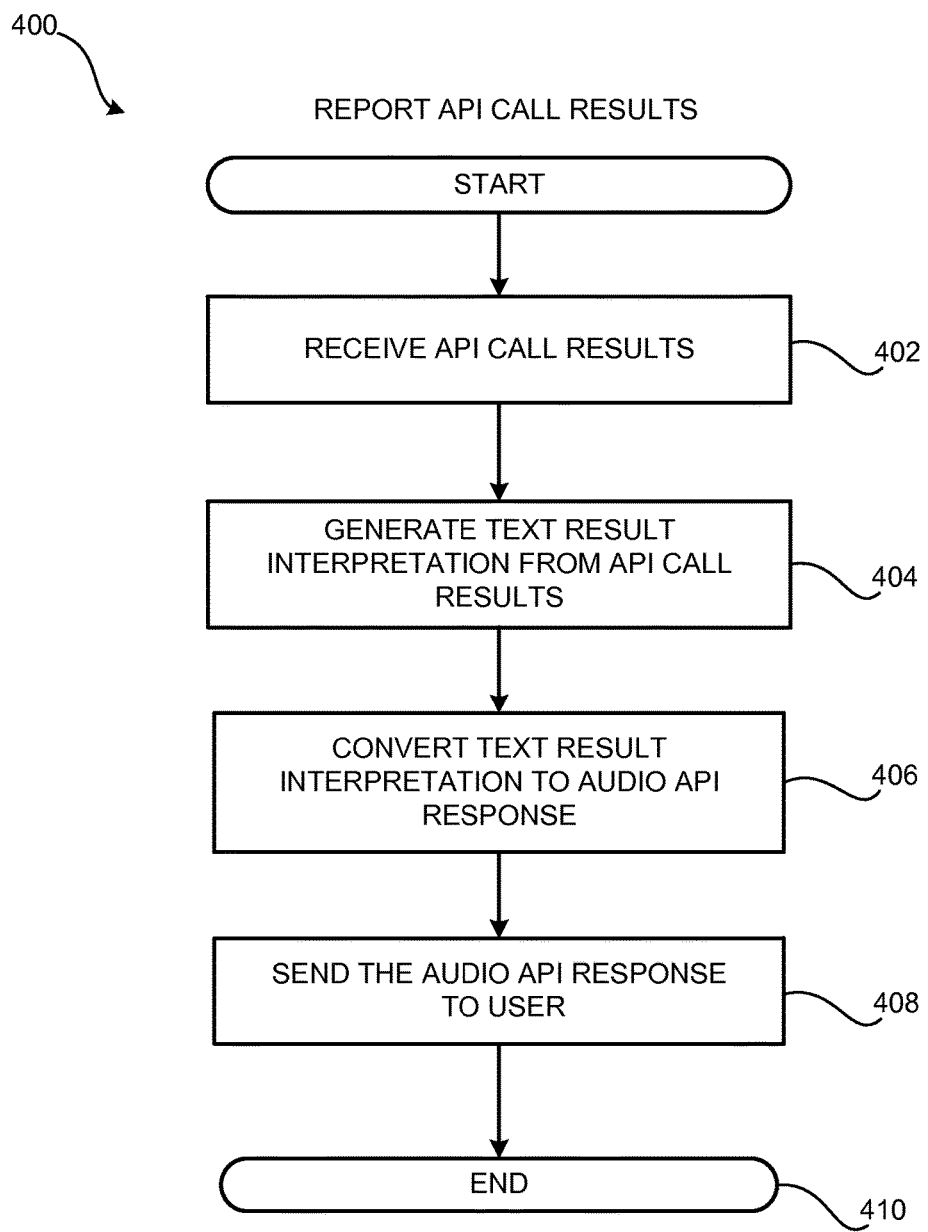
FIG. 4 is a flow diagram showing one illustrative routine for reporting API call results through audio API responses to a client, according to one embodiment disclosed herein.

FIG. 4 is a flow diagram showing one illustrative routine 400 for reporting API call results 130 through audio API responses 122 to the client 102, according to one embodiment disclosed herein. In some implementations, the voice API interface 108 described above in regard to FIG. 1 and employed to perform the routine 300 may also perform the routine 400. It should be appreciated that the routine 400 might also be performed by modules and/or components of entities in the system 100 that are different from the modules and/or components performing the routine 300.

The routine 400 begins at operation 402, where an API call result 130 may be received at the voice API interface 108 from a corresponding API 114 of a service 112. The routine 400 then proceeds to operation 404, where a text result interpretation 212 may be generated from the received API call result 130. As discussed above, the text result interpretation 212 may be generated by translating abstract representations of the API call result 130 to a human-understandable language. Such a translation may be provided or indicated in the corresponding annotated API description 124, or may be generated by the voice API interface 108 based on the annotated API description 124. From operation 404, the routine 400 proceeds to operation 406, where the text result interpretation 212 may be converted into an audio API response 122 through speech synthesis. The speech synthesis information contained in the speech annotation 126 of the annotated API description 124 may be utilized to facilitate the speech synthesis, such as the phonetic transcriptions of words contained in the text result interpretation 212, prosody information of the text result interpretation 212, and/or access information for recorded speech of elements in the text result interpretation 212. Other information may also be included in the speech annotation 126 and be utilized in the speech synthesis process.

Once the audio API response 122 is generated, the routine 400 may then proceed to operation 408, where the audio API response 122 may be sent to the client 102 for presentation to the user 104. The audio API response 122 may be presented to the user 104 instantly or may be stored in a storage medium accessible to the user 104. The user 104 may then retrieve and listen to the audio API response 122 at his/her leisure. The routine 400 then proceeds to operation 410, where it ends.

Figure 5:
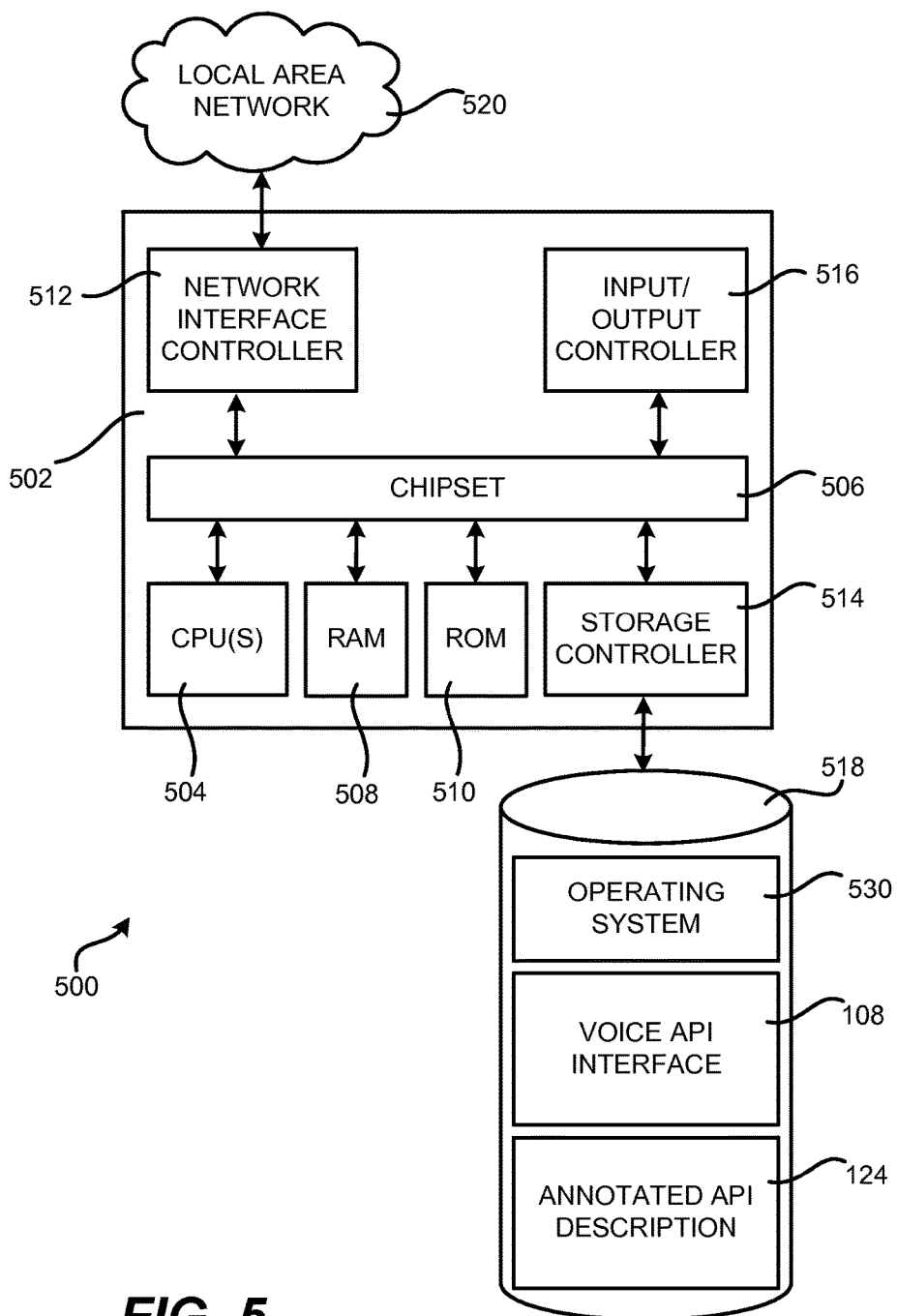
FIG. 5 is a computer architecture diagram showing an illustrative computer hardware architecture for implementing a computing device that might be utilized to implement aspects of the various embodiments presented herein.

FIG. 5 shows an example computer architecture for a computer 500 capable of executing the program components described above for invoking API calls for services through voice commands. The computer architecture shown in FIG. 5 illustrates a conventional server computer, workstation, desktop computer, laptop, tablet, network appliance, personal digital assistant ("PDA"), e-reader, digital cellular phone, or other computing device, and may be utilized to execute any aspects of the software components presented herein. For example, the computer architecture shown in FIG. 5 may be utilized to execute the API call interface 108, the client 102 or one or more services 112 shown in FIG. 1 and described above.

The computer 500 includes a baseboard 502, or "motherboard," which is a printed circuit board to which a multitude of components or devices may be connected by way of a system bus or other electrical communication paths. In one illustrative embodiment, one or more central processing units ("CPUs") 504 operate in conjunction with a chipset 506. The CPUs 504 may be standard programmable processors that perform arithmetic and logical operations necessary for the operation of the computer 500.

The CPUs 504 perform operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 506 provides an interface between the CPUs 504 and the remainder of the components and devices on the baseboard 502. The chipset 506 may provide an interface to a random access memory ("RAM") 508, used as the main memory in the computer 500. The chipset 506 may further provide an interface to a computer-readable storage medium such as a read-only memory ("ROM") 510 or non-volatile RAM ("NVRAM") for storing basic routines that help to startup the computer 500 and to transfer information between the various components and devices. The ROM 510 or NVRAM may also store other software components necessary for the operation of the computer 500 in accordance with the embodiments described herein.

The computer 500 may operate in a networked environment using logical connections to remote computing devices and computer systems through a network, such as the local area network 520. The chipset 506 may include functionality for providing network connectivity through a network interface controller 512 ("NIC"), such as a gigabit Ethernet adapter. The NIC 512 is capable of connecting the computer 500 to other computing devices over the network 520. It should be appreciated that multiple NICs 512 may be present in the computer 500, connecting the computer to other types of networks and remote computer systems.

The computer 500 may be connected to a mass storage device 518 that provides non-volatile storage for the computer. The mass storage device 518 may store system programs, application programs, other program modules, and data, which have been described in greater detail herein. The mass storage device 518 may be connected to the computer 500 through a storage controller 514 connected to the chipset 506. The mass storage device 518 may consist of one or more physical storage units. The storage controller 514 may interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 500 may store data on the mass storage device 518 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 518 is characterized as primary or secondary storage, and the like.

For example, the computer 500 may store information to the mass storage device 518 by issuing instructions through the storage controller 514 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 500 may further read information from the mass storage device 518 by detecting the physical states or characteristics of one or more particular locations within the physical storage units.

In addition to the mass storage device 518 described above, the computer 500 may have access to other computer-readable storage media to store and retrieve information, such as program modules, data structures, or other data. It should be appreciated by those skilled in the art that computer-readable storage media can be any available media that provides for the storage of non-transitory data and that may be accessed by the computer 500.

By way of example, and not limitation, computer-readable storage media may include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

The mass storage device 518 may store an operating system 530 utilized to control the operation of the computer 500. According to one embodiment, the operating system comprises the LINUX operating system. According to another embodiment, the operating system comprises the WINDOWS® SERVER operating system from MICROSOFT Corporation. According to further embodiments, the operating system may comprise the UNIX or SOLARIS operating systems. It should be appreciated that other operating systems may also be utilized. The mass storage device 518 may store other system or application programs and data utilized by the computer 500, such as the voice API interface 108, the annotated API description 124 and/or any of the other software components and data described above. The mass storage device 518 might also store other programs and data not specifically identified herein.

In one embodiment, the mass storage device 518 or other computer-readable storage media is encoded with computer-executable instructions which, when loaded into the computer 500, transforms the computer from a general-purpose computing system into a special-purpose computer capable of implementing the embodiments described herein. These computer-executable instructions transform the computer 500 by specifying how the CPUs 504 transition between states, as described above. According to one embodiment, the computer 500 has access to computer-readable storage media storing computer-executable instructions which, when executed by the computer 500, perform the routines described above with regard to FIGS. 3 and 4. The computer 500 might also include computer-readable storage media for performing any of the other computer-implemented operations described herein.

The computer 500 may also include one or more input/output controllers 516 for receiving and processing input from a number of input devices, such as a keyboard, a mouse, a touchpad, a touch screen, an electronic stylus, or other type of input device. Similarly, the input/output controller 516 may provide output to a display, such as a computer monitor, a flat-panel display, a digital projector, a printer, a plotter, or other type of output device. It will be appreciated that the computer 500 may not include all of the components shown in FIG. 5, may include other components that are not explicitly shown in FIG. 5, or may utilize an architecture completely different than that shown in FIG. 5.

Based on the foregoing, it should be appreciated that technologies for invoking API calls through voice commands has been presented herein. Moreover, although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the example embodiments and applications illustrated and described, and without departing from the true spirit and scope of the present invention, which is set forth in the following claims.

What is claimed is:

1. A computer-implemented method for invoking application programming interface ("API") calls through voice commands, the method comprising executing instructions in a computer system to perform the operations of:
    receiving an annotated API description comprising descriptions of one or more APIs and speech annotations for the one or more APIs;
    receiving a voice API command from a user;
    converting the voice API command into a text API command using the speech annotations in the annotated API description;
    translating the text API command into an API call request based on the annotated API description;
    invoking an API call by sending the API call request to a corresponding API;
    receiving an API call result from the corresponding API;
    generating a text result interpretation based on the API call result using the annotated API description;
    converting the text result interpretation into an audio API response using the speech annotations in the annotated API description; and
    generating the audio API response.

2. The computer-implemented method of claim 1, further comprising:
    determining if the text API command is to be verified; and
    in response to determining that the text API command is to be verified, verifying the text API command with the user prior to translating the text API command into the API call request.

3. The computer-implemented method of claim 1, wherein generating the text result interpretation based on the API call result comprises processing the API call result based on a preference specified by the user through a user account.

4. The computer-implemented method of claim 1, wherein the speech annotations for the one or more APIs comprise acoustic models for one or more keywords of the one or more APIs.

5. The computer-implemented method of claim 1, wherein the annotated API description further comprises interpretation of API call results of the one or more APIs in human-understandable language.

6. The computer-implemented method of claim 1, wherein the speech annotations for the one or more APIs are adapted to a preferred language of the user.

7. The computer-implemented method of claim 1, wherein the one or more APIs comprise web service APIs.

8. A computer system for invoking application programming interface ("API") calls through voice commands, the system comprising:
    at least one computing device executing a voice API interface configured to
        receive an annotated API description describing the one or more APIs, the annotated API description comprising speech annotations for the one or more APIs and a mapping of API call results of the one or more APIs to a text result,
        receive a voice API command from a user,
        convert the voice API command into an API call request based on the annotated API description,
        send the API call request to one or more APIs exposed by services hosted by one or more computing devices and receive an API call result from the one or more APIs, and
        generate an audio API response based on the API call result by generating text result based on the API call results using the annotated API description and by converting the text result into the audio API response using the speech annotations in the annotated API description.

9. The computer system of claim 8, wherein the voice API interface is further configured to:
    determine if the voice API command is to be verified; and
    in response to determining that the voice API command is to be verified, verifying the voice API command with the user prior to converting the voice API command into the API call request.

10. The computer system of claim 8, wherein the voice API interface comprises:
    a speech to text engine configured to convert the voice API command into a text API command using the speech annotations in the annotated API description; and
    an API call interpreter configured to translate the text API command into an API call request based on the annotated API description.

11. The computer system of claim 10, wherein the API call interpreter is further configured to perform the generating of the text result based on the API call results using the annotated API description; and wherein the voice API interface further comprises a text to speech engine that is configured to perform the converting of the text result into the audio API response using the speech annotations in the annotated API description.

12. The computer system of claim 8, wherein the speech annotations for the one or more APIs comprise acoustic models for one or more keywords of the one or more APIs.

13. The computer system of claim 8, wherein the APIs are web service APIs.

14. The computer system of claim 8, wherein generating the text result interpretation based on the API call result comprises processing the API call result based on a preference specified by the user through a user account.

15. A non-transitory computer-readable storage medium having computer-executable instructions stored thereupon which, when executed by a computer, cause the computer to:
convert a voice API command received from a user into an API call request using speech annotations contained in an annotated API description for one or more APIs, the annotated API description further comprising interpretation of API call results of the one or more APIs in human-understandable language;
send the API call request to a corresponding API;
receive an API call result from the corresponding API; and
generate an audio API response based on the API call result by generating a text result interpretation based on the API call result using the annotated API description and by converting the text result interpretation into the audio API response using the speech annotations in the annotated API description.

16. The non-transitory computer-readable storage medium of claim 15, comprising further computer executable instructions which, when executed by the computer, cause the computer to:
determine if the voice API command is to be verified; and
in response to determining that the voice API command is to be verified, verify the voice API command with the user prior to converting the voice API command into the API call request.

17. The non-transitory computer-readable storage medium of claim 15, wherein converting the voice API command into the API call request comprises:
converting the voice API command into a text API command using the speech annotations in the annotated API description; and
translating the text API command into the API call request based on the annotated API description.

18. The non-transitory computer-readable storage medium of claim 15, wherein the speech annotations for the one or more APIs comprise acoustic models for one or more keywords of the one or more APIs.

19. The non-transitory computer-readable storage medium of claim 15, wherein the one or more APIs comprise web service APIs.

20. The non-transitory computer-readable storage medium of claim 15, wherein generating the text result interpretation based on the API call result comprises processing the API call result based on a preference specified by the user through a user account.

* * * * *